US006157487A

United States Patent [19]

Staub et al.

[11] Patent Number: 6,157,487

[45] Date of Patent: Dec. 5, 2000

[54] OPTICALLY VARIABLE SURFACE PATTERN

[75] Inventors: Rene Staub, Cham; Wayne Robert Tompkin, Ennetbaden, both of Switzerland

[73] Assignee: OVD Kinegram AG, Zug, Switzerland

[21] Appl. No.: 09/066,390

[22] PCT Filed: Nov. 20, 1996

[86] PCT No.: PCT/EP96/05114

§ 371 Date: Apr. 29, 1998

§ 102(e) Date: Apr. 29, 1998

[87] PCT Pub. No.: WO97/19821

PCT Pub. Date: Jun. 5, 1997

[30] Foreign Application Priority Data

| | | | |
|---|---|---|---|
| Nov. 28, 1995 | [CH] | Switzerland | 3368/95 |
| Feb. 20, 1996 | [EP] | European Pat. Off. | 96102497 |

[51] Int. Cl.[7] G02B 5/18

[52] U.S. Cl. 359/567; 359/566; 359/571; 359/575

[58] Field of Search 359/566, 567, 359/571, 575

[56] References Cited

U.S. PATENT DOCUMENTS

| | | | |
|---|---|---|---|
| 5,032,003 | 7/1991 | Antes | 359/566 |
| 5,161,057 | 11/1992 | Johnson | 359/566 |
| 5,428,479 | 6/1995 | Lee | 359/567 |
| 5,825,547 | 10/1998 | Lee | 359/567 |

*Primary Examiner*—Cassandra Spyrou
*Assistant Examiner*—Jennifer Winstedt
*Attorney, Agent, or Firm*—Proskauer Rose LLP

[57] ABSTRACT

An optically variable surface pattern includes at least one graphic representation producing an achromatic impression when viewed in visible light over a certain angular range without noticeable color fringes occurring in the adjoining angular ranges. A plane surface portion includes a grating structure which disperses incident light with comparable intensity into a cone within a predetermined angle range regardless of differing wavelength. An overlap of several successive high orders of diffraction results in a recombination of the dispersed light to white light at any diffraction angle within the cone. The surface portion viewed from a direction within the cone reflects white light, in contrast to a simple flat mirror which has a very narrow range of specular reflection. At viewing angles outside the cone, the surface portion is dim or dark grey. The shape of the surface portion is then recognized as an area white lit or dark depending upon a particular viewing angle relative to incident light.

18 Claims, 3 Drawing Sheets

OPTICALLY VARIABLE SURFACE PATTERN

BACKGROUND OF THE INVENTION

The invention relates to an optically variable surface pattern of the kind set forth in the classifying portion of claim 1.

Such optically variable surface patterns with a microscopically fine relief structure are suitable for example for increasing the level of security against forgery and for conspicuously identifying articles of all kinds and can be used in particular in relation to value-bearing papers or bonds, identity cards, payment means and similar articles to be safeguarded.

A surface pattern of the kind set forth in the classifying portion of claim 1 is known from EP 375 833. The surface pattern which is embossed in the form of a light-modifying relief structure into a carrier is subdivided into grid areas. Each grid area is divided into a number n of surface portions, wherein each surface portion is associated with a pixel of one of n representations and wherein each has a respective diffraction element which contains items of information about a chromaticity, a brightness value and a viewing direction. The n representations are composed of beams of diffracted light which become visible at n different viewing directions. In order that a representation becomes visible only at a single viewing direction the corresponding relief structures are of an asymmetrical profile shape.

EP 360 969 discloses a diffraction element which has surface portions with colours of high luminosity. The surface portions contain relief structures which are in the form of diffraction gratings with an asymmetrical profile shape, for example with a sawtooth-shaped profile configuration. The diffraction gratings reflect incident light predominantly in the first diffraction order. For that reason the diffraction gratings change their colour with a varying direction of incidence of the light and a varying direction of view on the part of an observer. The achievable degree of asymmetry, that is to say the ratio of the level of intensity of the light diffracted into the plus first diffraction order to the intensity of the light diffracted into the minus first diffraction order is typically 3:1 and at most 30:1.

DE 25 55 214 discloses optical markings which modify incident light essentially not by diffraction but by reflection or optical refraction on the basis of the laws of geometrical optics. With line spacings of 10 to 100 microns however those configurations already give profile heights of several or several tens of micrometres, at moderate reflection angles.

It is known from the technical literature, for example from the book "Diffraction Gratings", M. C. Hutley, Chapter 2, pages 13–56, ISBN 0-12-362980-2 that light of a wavelength λ which is incident on a grating structure from a direction of incidence is diffracted in accordance with the following relationship:

$$\sin(\theta_m)=\sin(\theta_i)+m*\lambda/d \quad (1)$$

wherein d denotes the grating period, $\theta_m$ and $\theta_i$ denote the intermediate angles between the line normal to the surface with the grating structure and the diffracted beam m and the incident beam i respectively and the integral index m denotes the diffraction order. There are only a finite number of diffraction orders. Accordingly polychromatic light is resolved by the grating structure into its spectral colours, that is to say light of different wavelengths is diffracted into different directions. Now various methods are known for diffracting the light of different wavelengths into the same direction in order within certain limits to avoid spectral colour resolution which is perceptible by the eye and thereby to achieve an achromatic impression. They are based on using grating structures with different grating periods. For example it is possible for grating structures with grating periods $d_1$, $d_2$ and $d_3$ to be arranged in mutually juxtaposed relationship in grid areas. The size of the grid areas is so selected that the grid areas are not separately perceptible by the human eye from a normal viewing distance of 30 cm. The periods $d_1$, $d_2$ and $d_3$ of the gratings are so selected that the spectra thereof are in superposed relationship in a predetermined viewing direction, more specifically in such a way that the diffraction directions of the red spectral component of the grating structure 1, the green spectral component of the grating structure 2 and the blue spectral component of the grating structure 3 are the same for a diffraction direction. The individual grating structures do not have to be arranged in mutually juxtaposed relationship but they can also be in mutually superposed relationship as for example in the case of holograms. Juxtaposition can also be replaced by a local, repetitive variation of the grating constant: the surface which is to appear achromatic is subdivided into individual surface portions whose dimensions are below the resolution limit of the human eye. Within a surface portion the local grating period (line spacing) varies in accordance with a predefined, for example linear function, over a given period range. It is further known in regard to an achromatic hologram for the grating period to be locally stochastically altered, see for example the book "Optical Holography", edited by P. Harriharan, Cambridge Studies in Modern Optics, pages 144 ff, ISBN 0 521 31162 2.

All those methods suffer from the common disadvantage that, although an achromatic impression can admittedly be produced for a predetermined viewing angle, pronounced colour fringes appear in the adjoining viewing angles. If moreover the viewing range over which a representation is to appear achromatic is increased by a large period extent, the brightness which can be perceived by an observer decreases noticeably as the incident light is distributed over a correspondingly larger angular range.

SUMMARY OF THE INVENTION

According to the present invention there is provided an optically variable surface pattern as set forth in claim 1.

Embodiments of the present invention provide an optically variable surface pattern which is difficult to forge, with at least one representation of a graphic configuration, wherein the representation produces an achromatic impression when viewed in visible light over a certain angular range without noticeable colour fringes occurring in the adjoining angular ranges.

For the purposes of describing the general idea of the invention, let it be established as the initial situation that a surface pattern contains at least n=2 representations. The surface pattern is therefore subdivided into first and second surface portions. The first surface portions serve to produce the first representation and the second surface portions serve to produce the second representation. Both representations are to be achromatic, that is to say they are to be visible in the colour of the light illuminating them and they are also not to produce changing colour effects when the surface pattern is turned or tilted. In accordance with geometrically optical notions, the specified object is attained in that the surface portions belonging to the first representation are in the form of reflecting surfaces which are inclined through a first predetermined angle of inclination $\alpha_1$ with a first predetermined azimuthal orientation $\Phi_1$ with respect to the plane of the surface pattern, or they are in the form of diffusely scattering matt structures. Instead of a diffusely scattering matt structure, it is also possible to provide a mirror surface which is disposed in the plane of the surface pattern. The reflecting surfaces belonging to the second representation are inclined relative to the plane of the surface pattern in another azimuthal orientation $\Phi_2$ through a second angle of inclination $\alpha_2$. With the predetermined viewing direction an inclined surface portion produces a light pixel whereas a matt structure or mirror surface produces a dark pixel. With an angle of inclination of 15° and an extent of the surface portions of a maximum of 100 micrometres however there are differences in respect of height relative to the plane of the surface pattern of about 27 micrometres. Therefore each inclined surface portion is broken down into an organisation of narrower surface portions which are arranged in parallel side-by-side relationship, with the same angle of inclination $\alpha_1$ and $\alpha_2$ respectively. This organisation which replaces the original surface portion is a relief structure and in cross-section is of a sawtooth-shaped profile whose grating period and profile height are matched to each other in such a way that the light diffracted at the sawtooth-shaped profile of the relief structure behaves in a first approximation similarly to the light reflected at the original inclined surface portion. Such a behaviour is achieved if the profile height of the sawtooth is approximately an integral multiple of half the optical path length of the light, in which respect that condition is possibly to be adapted to the angle of incidence of the light. That condition is approximately simultaneously met for an optical path length of 3.3 or 7.15 micrometres for example for the three wavelengths in the visible range $\lambda_1$=450 nm, $\lambda_2$=550 nm and $\lambda_3$=650 nm. If the reflecting surface is covered with a lacquer layer with an optical refractive index of 1.5, that gives a profile height which is reduced by the factor n=1.5, of 1.1 and 2.37 micrometres respectively.

In the case of a surface pattern embodying the invention each of the two representations is visible from only one viewing direction, in which case the two representations do not interfere with each other.

DETAILED DESCRIPTION OF THE INVENTION

From an optical-diffraction point of view embodiments of the invention afford the teaching of using grating structures with a large grating period, that is to say a small number of lines, so that many diffraction orders can occur in the visible range, to produce an achromatic optical impression in respect of the two representations. In addition the profile shape is to be such that the maximum possible proportion of the diffracted light is diffracted into higher diffraction orders. So that the ratio between the light which is diffracted into positive diffraction orders and the light which is diffracted into negative diffraction orders is as high as possible, grating structures with an asymmetrical profile shape and in particular a sawtooth profile shape are to be used. These ideas are described in greater detail hereinafter.

In the case of grating structures with a small number of lines many diffraction orders can exist in accordance with equation (1). With a number of lines of 100 lines/mm and with a wavelength of λ=550 nm, with perpendicular incidence the diffraction orders m=−18, −17, −16, . . . −1, 0, +1, . . . , +17, +18 can occur, that is to say 37 diffraction orders within the full diffraction angle range of −90° to +90°. The angle spacing between adjacent diffraction orders is typically 3–4°.

The diffraction angles $\theta_m$ are determined in accordance with equation (1) by the period d of the grating structure. The levels of intensity of the light which is diffracted into the various discrete diffraction orders are determined by the profile shape and the profile height of the grating structure. By suitable selection of those two parameters, it is possible to control the distribution of intensity of the diffracted light in such a way that light of the wavelength λ is diffracted for the major part into diffraction orders whose diffraction angles $\theta_m$ are close together in a narrow angle range ψ. The incident polychromatic light is also diffracted into the narrow angle range ψ for all different wavelengths λ. The grating structure therefore appears to the viewer within the angle range ψ light and achromatic, in the colour of the light illuminating the grating structure, while it is dark outside the angle range ψ.

Figure 1:
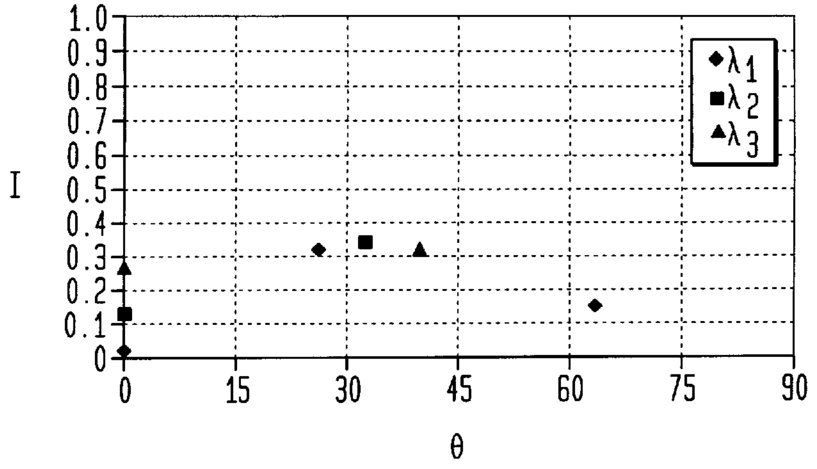
FIG. 1 (PRIOR ART)
FIG. 1 shows, as a function of the diffraction angle θ, the standardized intensities I of the diffraction orders of a conventional grating with sinusoidal profile shape, wherein the light is incident perpendicularly.

FIG. 1 shows as a function of the diffraction angle θ the standardised intensities I of the diffraction orders of a conventional grating with a sinusoidal profile shape, wherein the light is incident perpendicularly. The grating has a number of lines of 1000 lines/mm and a profile height of 155 nm. The spectra are calculated for the three wavelengths $\lambda_1$=450 nm, $\lambda_2$=550 nm and $\lambda_3$=650 nm, corresponding to the colours blue, green and red. The light of the three colours is diffracted into discrete angles $\theta_m$ which are far apart. There are two positive diffraction orders for the blue light, while there is only one for the green and the red light. As the grating has a sinusoidal and thus symmetrical profile shape, the same amount of light is also diffracted into negative diffraction angles $\theta_{-m}$. When the grating is turned and/or tilted, a viewer sees the surface occupied by the grating in changing colours.

Figure 2A:
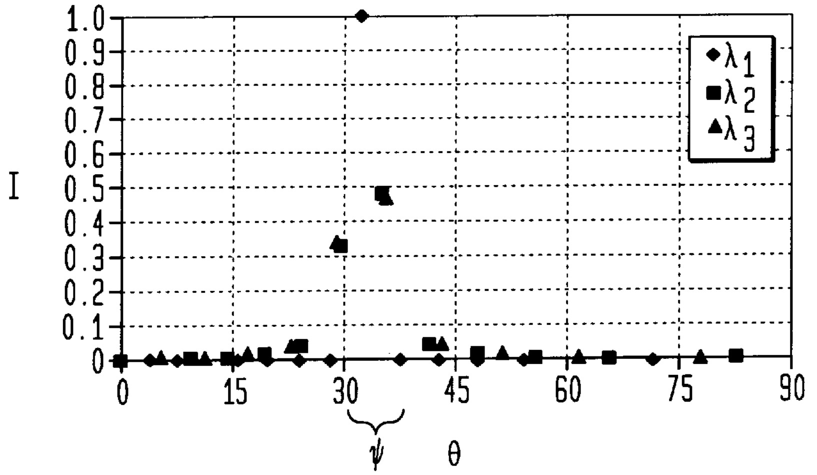
FIG. 2*a* shows the standardized intensities of the diffraction orders for a grating embodying the invention with a sawtooth-shaped profile shape.
Figure 2B:
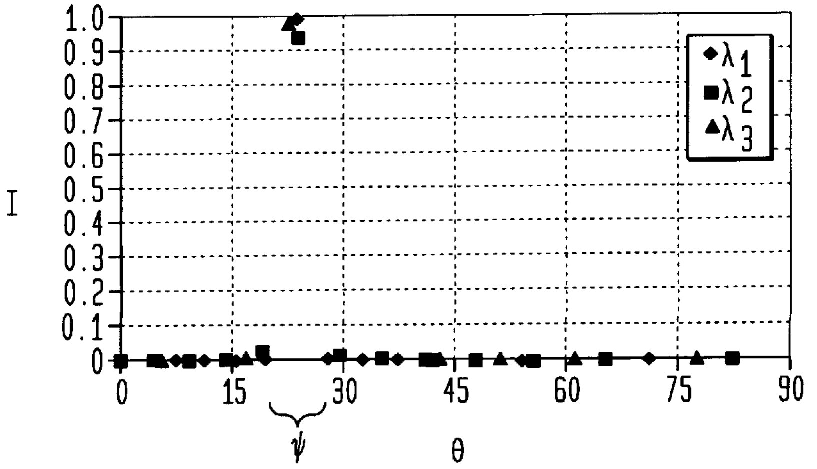
FIG. 2*b* shows the standardized intensities of the diffraction orders for another grating embodying the invention with a sawtooth-shaped profile shape.

FIGS. 2*a* and 2*b* show the standardised intensities of the diffraction orders for two gratings embodying the invention with a sawtooth-shaped profile shape. The gratings both have a number of lines of 150 lines/mm but different profile heights h of 1.8 μm and 1.3 μm respectively. It is clearly apparent that the light of all three colours is diffracted with a high level of intensity into a narrow angle range ψ at about +32° and +26° respectively. In the first case the angle range ψ covers approximately angles θ of 30°–35°. Only very little light is diffracted into the other, both positive and negative, diffraction orders. Practically no light is also diffracted into the angle range at −32° and −26° respectively as, because of the asymmetrical profile shape of the corresponding grating, it is readily possible to achieve a ratio of the light which is diffracted into the positive diffraction orders to the light which is diffracted into the negative diffraction orders, of at least 100:1. Therefore, each of those two gratings appears to a viewer in a relatively narrow angle range ψ as an achromatic surface while in the remaining angle ranges it appears as a dark surface, without noticeable colour fringes occurring when the grating is turned and/or tilted. If the gratings are covered with a lacquer layer with a refractive index of n=1.5 the profile height h can be reduced by a factor n to 1.2 μm and 0.89 μm respectively. By virtue of the selected profile shape and profile height of the gratings the light is diffracted into high positive diffraction orders with a high level of efficiency, more specifically green light approximately into the plus tenth.

The angle range ψ in which the viewer perceives the grating structures as being achromatic is determined by the number of lines: the smaller the number of lines, the narrower is the achromatic angle range ψ. The diffraction angle $\theta_m$ with the highest level of intensity increases with the profile height or the angle of inclination of the sawtooth, with a predetermined number of lines, as can be seen from FIGS. 2*a* and 2*b*.

As is to be noted from FIGS. 2*a* and 2*b*, discrete diffraction orders still occur, but only a few diffraction lines which are associated with the various spectral colours involve noticeable intensity within the angle range ψ, under normal illumination. Those diffraction lines are now so close together in terms of angle that the surface portion occupied by grating structures of that kind, when illuminated with white light and viewed from any direction within the angle range ψ, does not appear in changing colours but appears to the viewer as always remaining lit white or in other words as an achromatic surface.

The concentration of the diffracted light into a closely defined angle range ψ causes the illuminated surface portion to flash brightly when the observer tilts or turns the surface pattern. That effect cannot be achieved with other known optical-diffraction surface reliefs as there the light is diffracted in spectrally resolved form into a relatively large angle range. In addition the grating with such a large profile height cannot be copied with a holographic contact copy to produce a surface relief as with the holographic contact copy the profile height of the relief, for example resulting in photoresist, would typically be only about 0.1 to 0.2 μm. In addition other forms of the holographic copy procedure for producing a surface relief (see for example the description of the contact copy process and the two-step process in S. P. McGrew, Hologram Counterfeiting: Problems and Solutions, SPIE vol. 1210 Optical Security and Anticounterfeiting Systems 1990) also involve losing the pronounced asymmetry of the grating structure, which is also highly important so that the light is diffracted into high diffraction orders with a high level of efficiency. In addition a given profile shape is also a prerequisite for achieving the achromatic effect.

Embodiments of the invention are now described in greater detail hereinafter with reference to the drawings.

Figure 3:
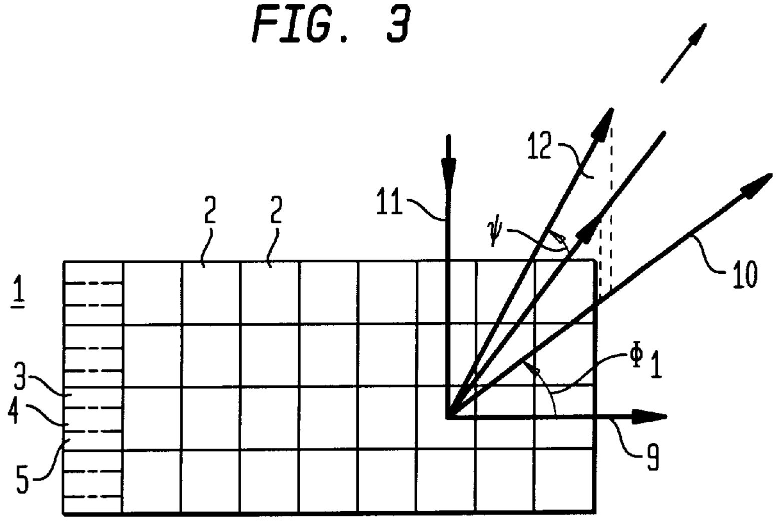
FIG. 3 shows a surface pattern.
Figure 4:
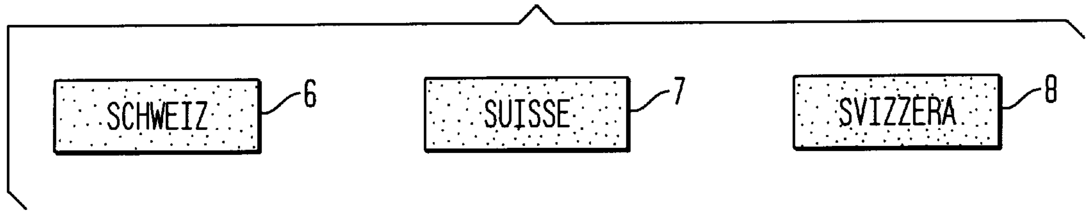
FIG. 4 shows three representations of graphic configuration.

FIG. 3 shows a surface pattern 1 which is subdivided matrix-like into n*m areas or fields 2. Each area 2 is subdivided into k=3 surface portions 3, 4 and 5. The totality of the surface portions 3, 4 and 5 respectively of all areas 2 contains a respective one of k=3 representations 6, 7 and 8 (FIG. 4). The azimuth angle Φ denotes relative to a reference direction 9 an orientation direction 10 within the plane of the surface pattern 1. The direction 11 denotes the direction of incidence of light which is incident on the surface pattern 1, a cone 12 denotes the angle range ψ into which light diffracted at the surface portions 3 of the representation 6 is predominantly focussed.

FIG. 4 shows the three representations 6, 7 and 8 which represent the graphics "Schweiz", "Suisse" and "Svizzera". The graphics are light on a dark background. The representations 6, 7 and 8 are also subdivided matrix-like into small n*m grid areas which are either light or dark. A surface portion 3 (FIG. 3) is associated with each grid area of the representation 6, a surface portion 4 is associated with each grid area of the representation 7, and so forth.

Figure 5:
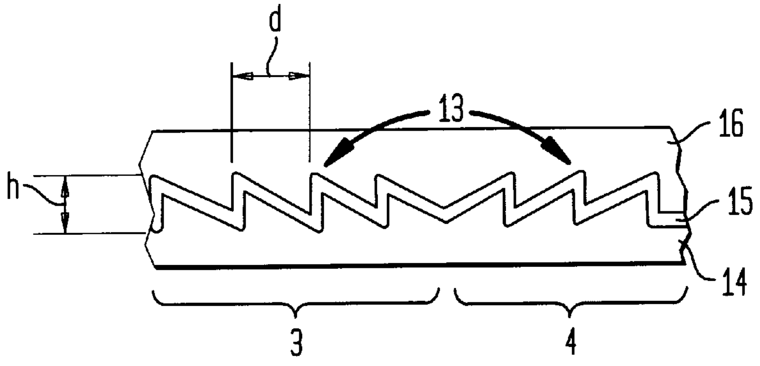
FIG. 5 shows the surface pattern in the form of a composite laminate with surface portions having a grating structure of a sawtooth-shaped profile shape.

If the grid area of the representations 6 is dark, the associated surface portion 3 contains a matt structure which diffusely scatters the incident light, or a flat, non-inclined mirror surface so that it appears dark for all angles or for all angles with the exception of the reflection angle. If the grid area is light, the associated surface portion 3 contains a grating structure 13 (FIG. 5) which diffracts the light incident in the predetermined direction of incidence 11 (FIG. 3), predominantly into the angle range ψ represented by the cone 12. The orientation and the spread angle ψ of the cone 12 are defined by the azimuth angle $\Phi_1$ of the grating structure 13 or the profile shape and the profile height of the grating structure 13. The grating structure 13 of the surface portions 3 has a comparatively small number of lines of typically 100 to 250 lines per millimetre and an asymmetrical profile shape, preferably a sawtooth profile shape, as is shown in FIG. 5. By virtue of the small number of lines, typically at least ten diffraction orders occur for visible light. The profile shape is now predetermined in such a way that the light in the visible range is diffracted with a high level of diffraction efficiency into as few as possible but high diffraction orders. Admittedly under some circumstances light is also somewhat diffracted into the other diffraction orders. The intensity thereof is very low so that it is not noticeable to a viewer. As the light is diffracted for the major part into diffraction angles $\theta_m$ of higher order m and as the diffractions angles $\theta_m$ for different wavelengths, for example $\lambda_1$=450 nm, $\lambda_2$=550 nm and $\lambda_3$=650 nm overlap, the achromatic behaviour on the part of the grating structure 13 is achieved in the predetermined angle range ψ: in the angle range ψ the representation 6 appears light while outside the angle range ψ the representation 6 is not visible. In addition, no observable changing colour effects as are typical in relation to optical-diffraction structures occur when the surface pattern 1 is turned and/or tilted. The term turn is used to mean that the surface pattern is turned about an axis which is perpendicular to the plane of the surface pattern. The term tilt is used to mean that the surface pattern is turned about an axis which is disposed in the plane thereof. To sum up it is found that the representation 6 can only be viewed from the predetermined solid angle range ψ with a fixed direction of incidence 11 of the light. In that case the representation 6 appears in the form of an image consisting of light and dark points which generally involve the colour of the reflection layer 15 (FIG. 5) used to cover the grating structures 13 and/or the cover layer 16 (FIG. 5).

The representation 7 is embodied with a similar grating structure 13 to that of the representation 6. The azimuth angle ψ thereof however involves an angle difference of preferably 180° relative to the azimuth angle $\Phi_1$, of the representation 6 so that the representation 7 is visible from a different solid angle range ψ, in which case it can also be perceived as an image composed of light and dark, achromatic points. It is possible to conceive of different image contents for the representations 6 and 7 from those adopted in FIG. 4, in which the angle difference of 180° provides advantageous effects. The prerequisite for nonetheless only a respective one of the two representations 6, 7 being perceptible is a high degree of asymmetry of the relationship of the light which is diffracted into positive diffraction orders and the light which is diffracted into negative diffraction orders. That ratio is typically at least 100:1 with a profile shape for the grating structure 13, which is optimised in relation to asymmetry.

The representation 8 is made with a grating structure 13 which has a higher number of lines of typically 800 and more lines per millimetre. By virtue of that high number of lines the representation 8 has pronounced optical-diffraction effects, that is to say changing colours with a high level of luminosity when the surface pattern 1 is turned and/or tilted.

It is not entirely impossible for the representations 6 and 7 to exhibit slight colour fringes in the transition from the visible angle range $\psi$ of the cone 12 into the invisible angle range. There is however the central region of the cone 12 in which the image impression is pronouncedly achromatic. In the case of the representation 8 in contrast there is no achromatic range, but that representation 8 appears in a colour which is well-defined from the optical-diffraction point of view, in any viewing angle.

As shown in FIG. 5 in cross-section, the surface pattern 1 is advantageously in the form of a composite laminate. The composite laminate is formed by a first lacquer layer 14, a reflection layer 15 and a second lacquer layer, the cover layer 16. The totality of the grating structures 13 and the matt structures of the surface portions 3–5 are embodied in the form of microscopically fine relief structures. The lacquer layer 14 is advantageously an adhesive layer so that the composite laminate can be glued directly onto a substrate. The cover layer 16 advantageously completely levels off the relief structures. In addition in the visible range it preferably has an optical refractive index of at least 1.5 so that the geometrical profile height h gives an optically effective profile height which is as large as possible. The cover layer 16 also serves as a scratch-resistant protective layer.

The subdivision of the representations 6 (FIG. 4), 7, etc. into grid areas does not have to be regular. That depends on the motifs of the representations 6, 7 etc. The surface portions 3 (FIG. 3), 4, etc. may also locally vary in shape and size. In order for example to increase a locally higher degree of brightness of a predetermined grid area of the representation 6, the surface portion 3 associated with the grid area of that representation may be increased within certain limits at the expense of the adjacent surface portions 4 or 5 of the other representations 7 or 8.

The subdivision of the representations 6, 7 and so forth into grid areas with light and dark pixels is not always meaningful or necessary. Each representation 6, 7 and so forth includes light and dark image regions. In embodiments of the invention, associated with the light image regions are surface portions 3, 4 and so forth with a grating structure 13 (FIG. 5) with predetermined grating parameters. The surface of the representations 6, 7 and so forth, which is occupied by the dark image regions, is provided on the surface pattern 1 (FIG. 3) either in the form of a surface portion with a matt structure or in the form of a reflecting non-inclined surface portion or is associated as a surface portion 3, 4 and so forth with a grating structure 13 with other grating parameters, with a light image region of another representation 6, 7 and so forth. Three further embodiments for achieving particular optical effects will now be described hereinafter, in which the surface portion 3, 4 and so forth associated with a dark image region of the representations 6, 7 and so forth also includes a diffracting relief structure.

Figure 6:
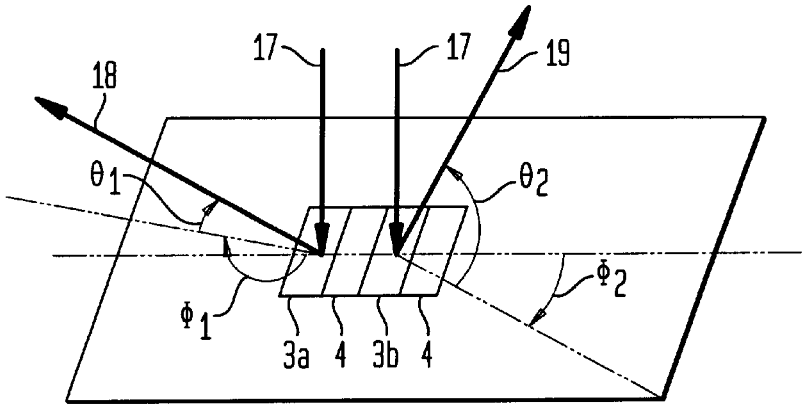
FIG. 6 shows details of a further surface pattern.

FIG. 6 shows two surface portions 3*a* and 3*b* of the surface pattern 1, wherein the surface portions 3*a* are associated with light image regions of the representation 6 (FIG. 4) while the surface portions 3*b* are associated with dark image regions thereof. The surface portion 3*a* contains a microscopically fine relief structure which diffracts perpendicularly incident light 17 into a first direction 18 in space, which is defined by the pair of angles ($\Phi_1$, $\theta_1$). The surface portion 3*b* contains a microscopically fine relief structure which diffracts perpendicularly incident light into a second direction 19 in space which is defined by the pair of angles ($\Phi_2$, $\theta_2$). The absolute difference between the two azimuth angles $|\Phi_1-\Phi_2|$ is typically at least 45°. That provides that, when light is incident perpendicularly, the surface portion 3*a* appears light and the surface portion 3*b* appears dark to a viewer looking onto the surface pattern 1 from the direction 18 in space. In contrast the surface portion 3*a* appears dark and the surface portion 3*b* appears light to a viewer looking onto the surface pattern 1 from the direction 19 in space. The representation 6 is thus perceptible with reversed contrast from the two directions 18 and 19 respectively. Each surface portion 3*a*, 3*b* and 4 has a largest linear dimension of at most 0.3 mm so that it is perceptible by eye at most as a structure-less point.

In a further embodiment for example the second representation 7 (FIG. 4) comprises two different motifs which are disposed in side-by-side relationship and do not overlap. The two motifs are to be visible from different viewing directions. In that case it is possible for both motifs to be disposed in the surface portions 4 which are associated with the grid areas of the second representation. The parameters of the relief structures of the first motif and those of the second motif are then different and can be established independently of each other. The same solution can also be used in relation to more than two motifs which do not overlap.

In addition for example the surface portion 4 associated with a dark grid area of the second representation 7 (FIG. 4) may contain the same relief structure as the adjacent surface portion 3 (FIG. 3) which is associated with a light grid area of the first representation 6. That makes it possible to increase the brightness of the corresponding grid area of the representation 6. That way of enhancing brightness is possible within the limits defined by the graphic contours of the representations 6, 7.

Figure 7:
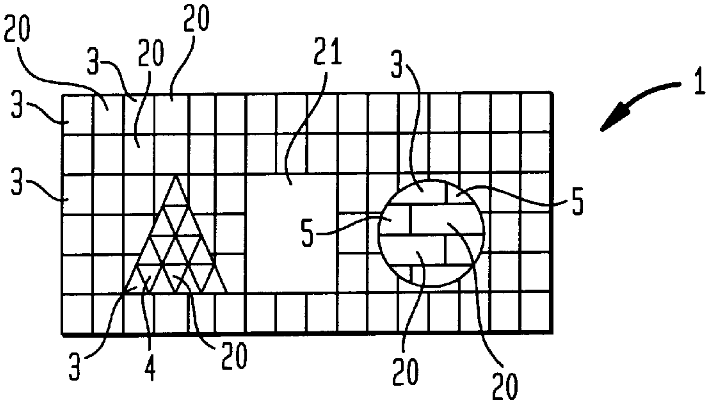
FIG. 7 shows a further surface pattern.

FIG. 7 shows the surface pattern 1 which as an example of the graphic configuration has a large rectangle, a triangle, a circular area and a small square. The triangle, the circular area and the square are arranged within the large rectangle without overlapping. The large rectangle corresponds to the first representation 6 (FIG. 4), the triangle corresponds to the second representation 7, the circular area corresponds to the third representation 8 and the square corresponds to a fourth representation. Those surface parts of the large rectangle which are not covered by the triangle, the circular area or the square represent a single surface portion 3 or are subdivided into surface portions 3 and 20. The area occupied by the triangle contains surface portions 3, 4 and 20. The circular area contains surface portions 3, 5 and 20. The area occupied by the square represents a single surface portion 21. The surface portions 3 contain a grating with a number of lines of 1000 lines/mm and a symmetrical profile shape so that the large rectangle exhibits rainbow colour effects when the surface pattern 1 is turned and/or tilted. The surface portions 4 contain a grating with a number of lines of 250 lines/mm whose azimuth angle is $\Phi_1$ (FIG. 6) and which has an asymmetrical profile shape whose profile height is so predetermined that the triangle appears achromatically light to a viewer looking from the predetermined direction 18 in space (FIG. 6). In other directions in space, the triangle is scarcely visible as the surface portions 3 appear substantially lighter than the surface portions 4. The surface portions 20 contain a matt structure or a mirror surface which is flat relative to the plane of the surface pattern 1. The surface portions 5 contain the same grating as the surface portions 4, but with another orientation in respect of the azimuth angle $\Phi_2$ (FIG. 6) . The circular area thus appears achromatically light from another direction 19 in space (FIG. 6). The surface portion 21 of the square also contains a relief structure which appears achromatically light from another predetermined direction in space. The relationship of the area proportions of the surface portions 3, 4, 5 and 20 determines the relative brightness of the four different representations. The greatest brightness is exhibited by the square whose full area is provided with a relief structure with an asymmetrical profile shape, which has a high level of diffraction efficiency. The levels of brightness of the triangle and the circular area, as well as the large rectangle, essentially depend on the proportional size of the area occupied by the surface portions 20. The relative brightnesses thereof can thus be controlled by means of using surface portions 20. With the exception of the area occupied by the square the individual surface portions 3, 4, 5 and 20 are of linear dimensions of at most 0.3 mm so that they are not individually perceptible by eye from a normal viewing distance of 30 cm. In the illustrated example they are shown on an enlarged scale for reasons relating to clarity of the drawing. The pronounced achromatic effect, the asymmetry of the diffraction effects and relative brightness levels serve as different security features.

Figure 8:
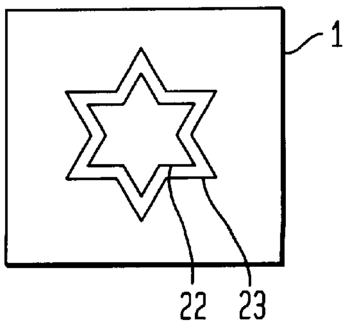
FIG. 8 shows a surface pattern made up of lines.

Relief structures which produce an achromatic effect can also be used for a surface pattern 1 in which subdivision of the representations into grid areas is not necessary or is not meaningful. FIG. 8 shows the surface pattern 1 with a star comprising at least two narrow lines 22, 23 which do not cross each other. The lines 22, 23 belong to two different representations,that is to say the line 22 is to be visible from a different viewing direction from the line 23. The line 22 has a first relief structure and the line 23 has a second relief structure to produce an achromatic effect, wherein the parameters of the two relief structures are selected to be different so that the lines 22 and 23 are visible from different directions in space. When the surface pattern is turned and/or tilted the star therefore exhibits a 15 kinematic effect insofar as the brightness levels of the lines 22 and 23 change. The kinematic effect can be refined with an increasing number of lines 22, 23.

Stated in generalised terms the surface pattern 1 can be subdivided into surface portions 3 (FIG. 3), 4, 5 and so forth of any shape which do not have to be either continuous or mutually adjoining, wherein groups of surface portions 3, 4, 5 and so forth which have the same relief structure are associated with predetermined representations 6 (FIG. 4), 7, 8 and so forth. In that way it is possible to integrate into the surface pattern 1 in particular representations which, similarly to conventional engraving, are made up of a plurality of lines. If lines of different representations overlap that nonetheless does not give troublesome optical effects as the area occupied by the points of intersection is very small in terms of proportion. The area of the surface pattern 1, which remains between the lines of the various representations, can be in the form of a matt or a reflecting surface.

The surface pattern 1 which has representations consisting of lines can be produced in a technologically simple manner in accordance with the teachings of European patent specification EP 330 738 or Swiss patent specification CH 664 030.

It will be appreciated that it is possible for the chromatic representations to have superimposed thereon motifs which in terms of proportion advantageously occupy only a very small area such as for example guilloche patterns or microscripts which exhibit kinematic colour effects. Such kinematic optical effects are known from European patent documents EP 105 099, EP 375 833 or EP 490 923 and products which are marketed under the name KINEGRAM®. If the representation 6 (FIG. 4) contains a first motif with a grating structure which achromatically diffracts impinging light into the predetermined angle range $\psi$ and a second motif with a grating structure which for example diffracts the green spectral component of the impinging light into a direction which is within the angle range $\psi$, then the two motifs reference each other in a manner which is easily recognisable for an observer. It is clear from FIGS. 1 and 2*a* that such referencing is possible for example with a sawtooth-shaped grating with a number of lines of 150 lines/mm and a profile height of 1.2 $\mu$m and a sinusoidal grating with 1000 lines/mm and a profile height of 0.155/1.5=0.1 $\mu$m if the gratings are covered with the lacquer layer 16 (FIG. 5) with a refractive index n=1.5. The two grating structures are arranged in the surface portions 3 (FIG. 3) which belong to the representation 6. In the case of holographic copying processes at least the diffraction angles $\theta$ of the two grating structures change in different ways so that the effect of the referencing is lost.

What is claimed is:

1. An optically variable surface pattern, comprising:

juxtaposed areas subdivided into reflective surface portions, each of the reflective surface portions comprising one of a diffracting grating structure, a matte structure and a non-inclined flat mirror surface;

a laminate in which said reflective surface portions are embedded;

representations of graphic configuration which include at least light and dark image regions, the reflective surface portions corresponding to the light image regions being comprised of the diffracting grating structure associated with a particular one of the representations such that the representations are visible at different viewing directions upon being illuminated by visible light; and the light image regions of at least one representation comprised of the reflective surface portions having a first grating structure with a line number of between about 100 and 250 lines per millimeter and with a profile height such that upon being illuminated, the light image regions of said at least one representation appear achromatically bright within at least one first cone with a predetermined first solid angle and appear achromatically dim outside of the first cone.

2. A surface pattern according to claim 1, wherein the dark image regions of said representation is composed of the surface portions having a second grating structure differing in at least one parameter from the first grating structure of the light image surface portions.

3. A surface pattern according to claim 2, wherein the second grating structure is sinusoidal and has a line number of at least 800 lines per millimeter.

4. A surface pattern according to claim 2, wherein:

the first and second grating structures differ in the optical profile height, which is the product of the geometrical profile height and the index of refraction of a cover layer of the laminate which covers the first and second grating stuctures; and the difference in optical profile height is at least 0.5 micrometer.

5. A surface pattern according to claim 1, wherein the dark image regions of said representation is comprised of the surface portions having a second grating structure with a line number between about 100 and 250 lines per millimeter and with such a profile shape and such a profile height that upon being illuminated the light image regions of said representation appear achromatically bright in at least one second cone with a predetermined second solid angle range and achromatically dim outside of the second cone, and said first and second cones do not overlap, so that said representation is visible in reversed contrast from two predetermined viewing directions.

6. A surface pattern according to claim 5, wherein for said representation, each of said first and second asymmetric grating structures has a sawtooth-shaped profile.

7. A surface pattern according to claim 1, wherein for said representation, said first grating structure has a sawtooth-shaped profile.

8. A surface pattern according to claim 1, wherein the dark image regions of said representation is comprised of the surface portions having the matte structure.

9. A surface pattern according to claim 1, wherein the dark image regions of said representation is comprised of the surface portions having the non-inclined flat mirror structure.

10. A surface pattern according claim 1, wherein the surface portions of the areas associated with the light image regions are arranged along lines and the surface portions of the areas associated with the dark image regions are arranged between the lines.

11. An optically variable surface pattern, comprising:

juxtaposed areas subdivided into reflective surface portions, each of the reflective surface portions comprising one of a diffracting grating structure, a matte structure and a non-inclined flat mirror surface;

a laminate in which said reflective surface portions are embedded;

at least first and second representations of graphic configuration which include light and dark image regions;

first surface portions of areas corresponding to the light image regions of the first representation having a structure of a first kind and the first surface portions of areas corresponding to the dark image regions of the first representation having a structure of a second kind;

second surface portions of areas corresponding to the light image regions of the second representation having a structure of a third kind and the second surface portions of areas corresponding to the dark image regions of the second representation having a structure of a fourth kind;

the structures of the first and third kind being gratings with a line number between about 100 and 250 lines per millimeter and with a profile shape and profile height such that upon being illuminated, the light image regions of said first and second representations appear achromatically bright within at least one first and one second cone, with a respective first and second solid angle range and appear achromatically dim outside of the first and second cone, and said first and second cones do not overlap.

12. A surface pattern according to claim 11, wherein the structure of the second kind is said matte structure.

13. A surface pattern according to claim 12, wherein the structure of the fourth kind is said matte structure.

14. A surface pattern according to claim 11, wherein the structure of the second kind is said non-inclined flat mirror structure.

15. A surface pattern according to claim 14, wherein the structure of the fourth kind is said non-inclined flat mirror structure.

16. A surface pattern according to claim 11, wherein the structure of the fourth kind is said matte structure.

17. A surface pattern according to claim 11, wherein the structure of the fourth kind is said non-inclined flat mirror structure.

18. A surface pattern according claim 11, wherein the surface portions of the areas associated with the light image regions are arranged along lines and the surface portions of the areas associated with the dark image regions are arranged between the lines.

* * * * *